(12) United States Patent
Chuang

(10) Patent No.: US 8,131,461 B2
(45) Date of Patent: Mar. 6, 2012

(54) NAVIGATION METHODS AND SYSTEMS

(75) Inventor: Hui-Ching Chuang, Kaohsiung (TW)

(73) Assignee: Mitac International Corp., Taoyuan (TW)

( * ) Notice: Subject to any disclaimer, the term of this patent is extended or adjusted under 35 U.S.C. 154(b) by 672 days.

(21) Appl. No.: 12/258,976

(22) Filed: Oct. 27, 2008

(65) Prior Publication Data

US 2009/0259393 A1    Oct. 15, 2009

(30) Foreign Application Priority Data

Apr. 14, 2008    (TW) ................. 97113460 A

(51) Int. Cl.
*G01C 21/26* (2006.01)
*G01C 21/34* (2006.01)

(52) U.S. Cl. ................. 701/211; 701/209; 340/995.19; 340/995.24

(58) Field of Classification Search .............. None
See application file for complete search history.

(56) References Cited

U.S. PATENT DOCUMENTS

| 5,677,837 A * | 10/1997 | Reynolds ............ 455/456.3 |
| 6,067,502 A * | 5/2000 | Hayashida et al. ........ 701/209 |
| 6,671,619 B2 * | 12/2003 | Kusano et al. ............ 701/209 |
| 2007/0112510 A1 * | 5/2007 | Ogawa ................... 701/209 |

FOREIGN PATENT DOCUMENTS

JP    2002-372433    * 12/2002

* cited by examiner

*Primary Examiner* — Michael J. Zanelli

(57) ABSTRACT

Navigation methods and systems are provided. First, an electronic device generates a route planning result according to at least a destination, and performs a navigation process according to the route planning result. It is determined whether at least one navigation condition has occurred. When the navigation condition has occurred, a position schematic diagram is displayed, wherein the position schematic diagram comprises the destination and a current position of the electronic device.

13 Claims, 4 Drawing Sheets

NAVIGATION METHODS AND SYSTEMS

CROSS REFERENCE TO RELATED APPLICATIONS

This Application claims priority of Taiwan Patent Application No. 97113460, filed on Apr. 14, 2008, the entirety of which is incorporated by reference herein.

BACKGROUND OF THE INVENTION

1. Field of the Invention

The disclosure relates generally to navigation methods and systems, and, more particularly to navigation methods and systems that provide diagrams for assisting destination recognition.

2. Description of the Related Art

Recently, wireless positioning technology, such as a GPS (Global Positioning System), has become an important application for electronic devices, such as computers and portable devices. The GPS can receive signals from satellites, and accordingly determine the position of the electronic device. Users can also use navigation software in the electronic device for route planning and navigation.

Conventionally, due to the design limitations of the navigation software, when streets, and/or lanes of a destination area are uniformly arranged and narrow, the navigation system may automatically terminate its navigation process. In this situation, users may be close to their destination, however, will not able to clearly recognize the correct location of their destination, since no relevant direction is provided.

BRIEF SUMMARY OF THE INVENTION

Navigation methods and systems are provided.

In an embodiment of a navigation method, a route planning result is generated according to at least a destination, and a navigation process is performed according to the route planning result by an electronic device. It is determined whether at least one navigation condition has occurred. When the navigation condition has occurred, a position schematic diagram is displayed, wherein the position schematic diagram comprises the destination and a current position of the electronic device.

An embodiment of a navigation system comprises a display unit and a processing unit. The processing unit generates a route planning result according to at least a destination, wherein an electronic device performs a navigation process according to the route planning result. The processing unit determines whether at least one navigation condition has occurred. When the navigation condition has occurred, the processing unit displays a position schematic diagram in the display unit, wherein the position schematic diagram comprises the destination and a current position of the electronic device.

Navigation methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Navigation methods and systems are provided.

Figure 1:
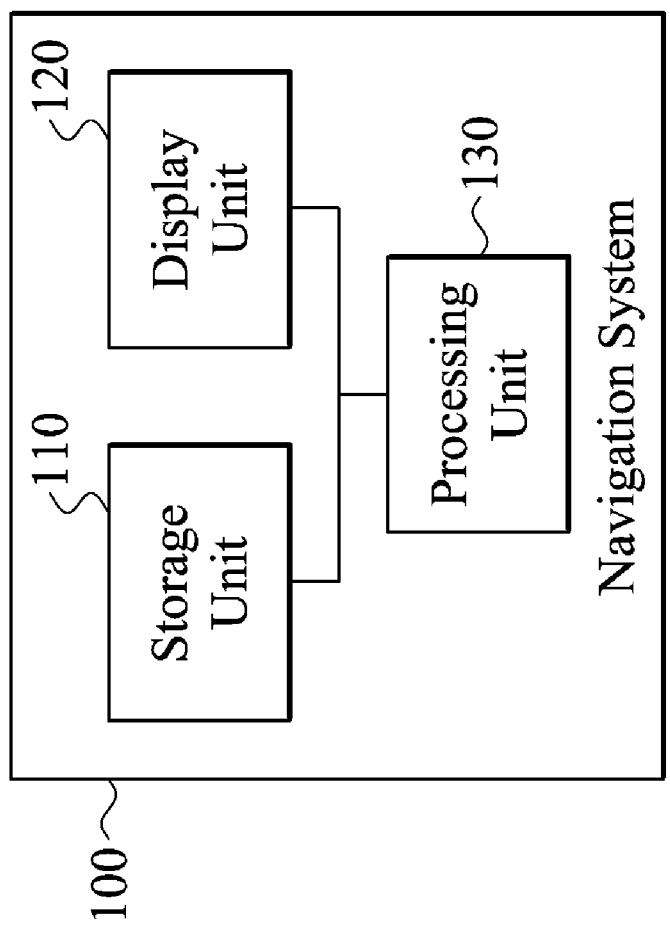
FIG. 1 is a schematic diagram illustrating an embodiment of a navigation system of the invention.

FIG. 1 is a schematic diagram illustrating an embodiment of a navigation system of the invention. The navigation system is suitable for use in an electronic device, such as a computer system or a portable device having a navigation function.

The navigation system 100 comprises a storage unit 110, a display unit 120, and a processing unit 130. The storage unit 110 comprises map data corresponding at least one specific region, such as an area or a country. The map data can comprise doorplate addresses, landmarks, scenic spots, and/or road and information thereof. The display unit 120 displays related data, such as a user interface, route planning results, and related navigation information. The processing unit 130 can be a navigation engine having a route planning capability. Users can input navigation parameters, such as a starting point, a destination, and/or at least one pass-through point via the user interface. The processing unit 130 performs route planning according to the navigation parameters to obtain at least one route planning result. Users can be navigated to the destination point according to the route planning result. It is noted that, the navigation system 100 can further comprise a signal reception unit (not shown) to receive satellite signals. The processing unit 130 can calculate a current position of the electronic device based on the received signals. When the current position of the electronic device conforms to the route planning result, the processing unit 130 can proceed to provide the navigation function according to the original route planning result. When the current position of the electronic device does not conform to the route planning result, the processing unit 130 can re-perform the route planning according to the current position of the electronic device.

Figure 2:
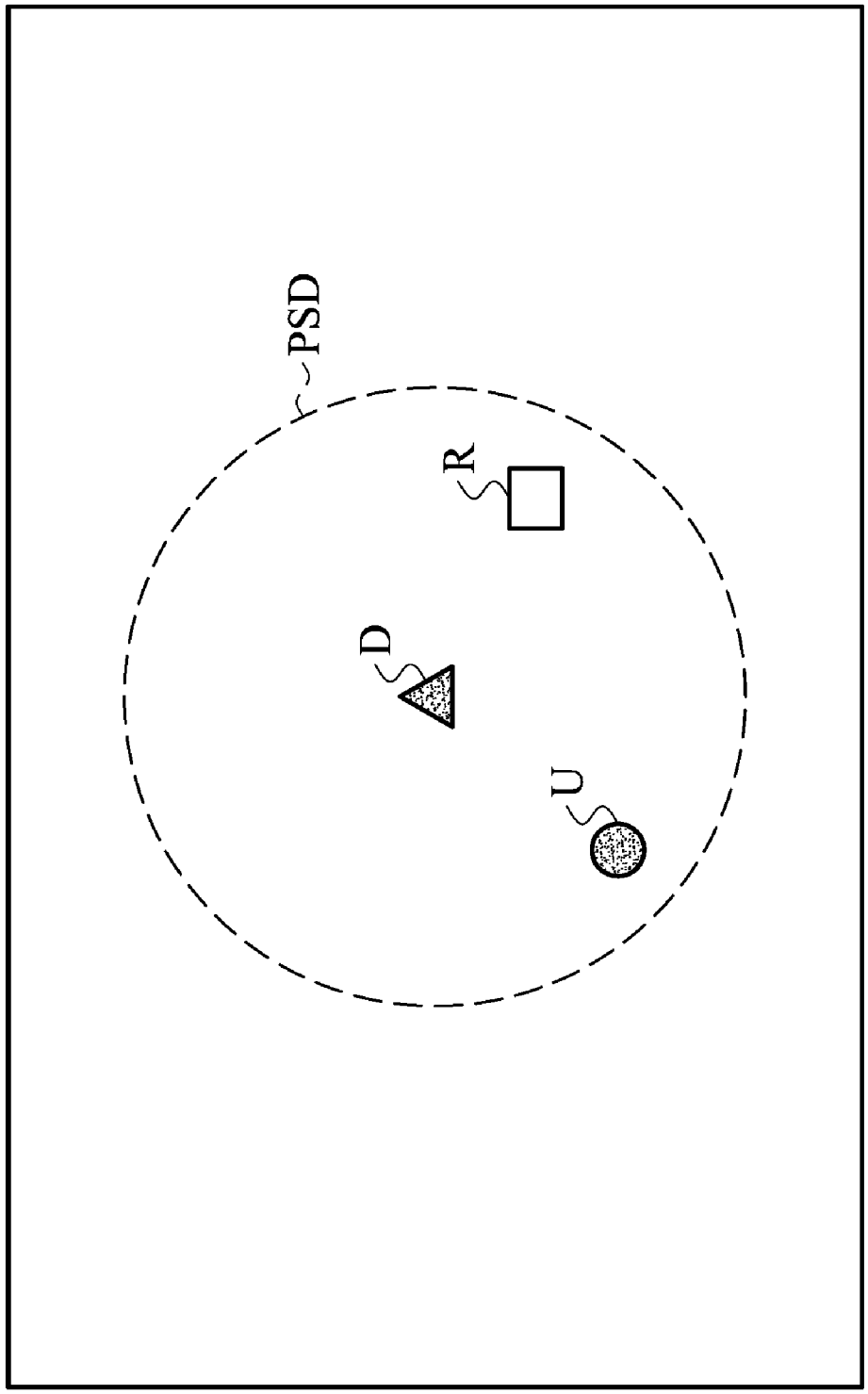
FIG. 2 is a schematic diagram illustrating an embodiment of a position schematic diagram of the invention.
Figure 3:
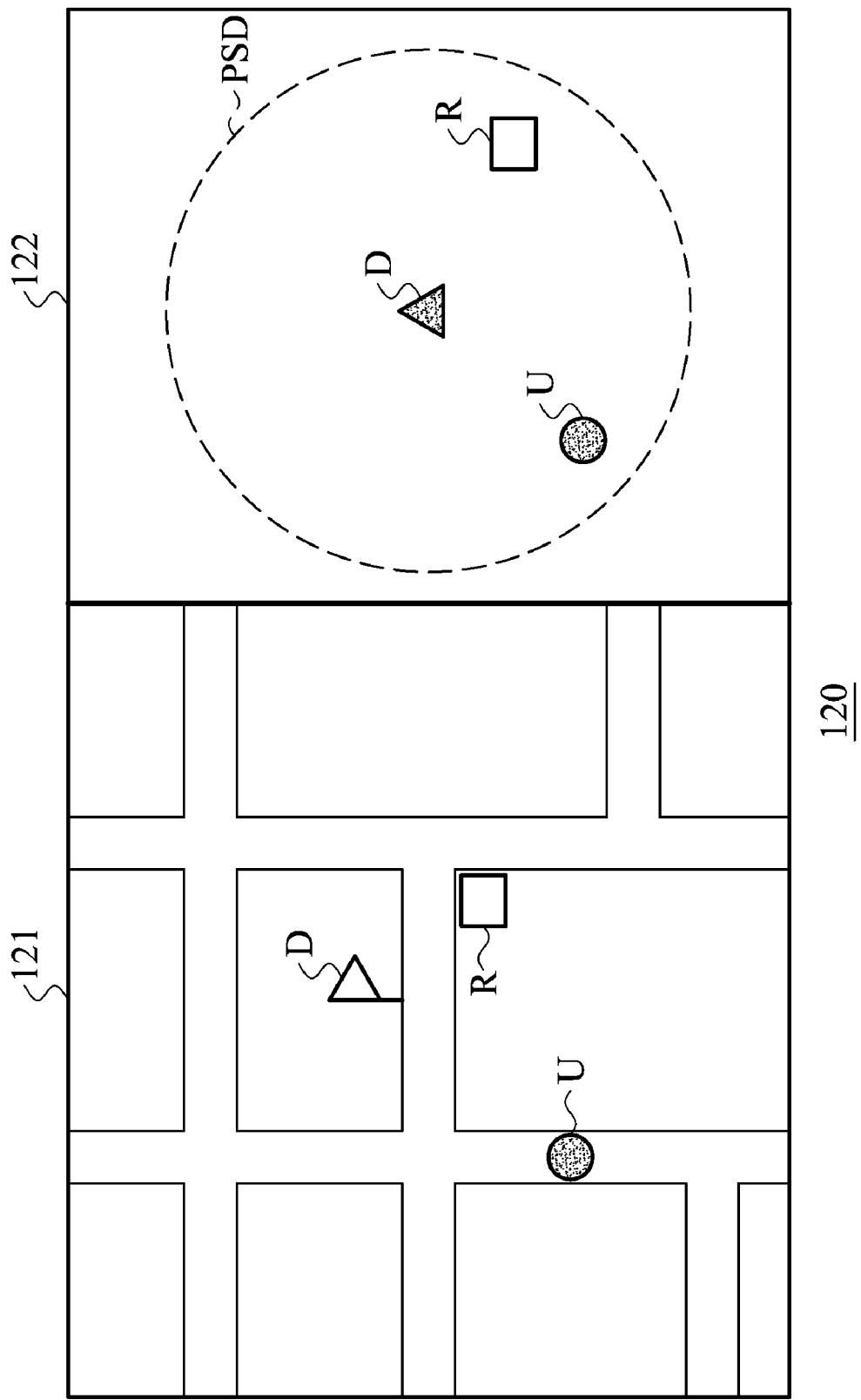
FIG. 3 is a schematic diagram illustrating an embodiment of a position schematic diagram of the invention, wherein the position schematic diagram is simultaneously displayed with a map.

The processing unit 130 can determine whether any specific navigation condition has occurred during the navigation process. When the specific navigation condition has occurred, the processing unit 130 can display a position schematic diagram via the display unit 120. The position schematic diagram can comprise the destination, the current position of the electronic device, and/or landmarks (reference points) for assisting destination recognition. In some embodiments, the center of the position schematic diagram can be the destination. In some embodiments, the position schematic diagram may be a circle having a center of the destination and a predefined radius. For example, FIG. 2 is a schematic diagram illustrating an embodiment of a position schematic diagram of the invention. As shown in FIG. 2, the display unit 120 displays a position schematic diagram PSD. The position schematic diagram PSD comprises a destination D, a current position of the electronic device U, and a landmark R. It is noted that, in the example of FIG. 2, the position schematic diagram PSD is displayed in the display unit 120. In some embodiments, the position schematic diagram PSD can be simultaneously displayed with the map data, as shown in FIG. 3, wherein the position schematic diagram PSD and the map are respectively displayed in window 122 and 121 of the display unit 120. It is noted that, in some embodiments, the processing unit 130 can calculate the distance between the destination and the current position of the electronic device, and indicate the distance in the position schematic diagram. In some embodiments, a specific locality, such as north can be also indicated in the position schematic diagram.

As described, the processing unit 130 can determine whether any specific navigation condition has occurred during the navigation process. The specific navigation condition can be predefined in the navigation system 100. For example, the navigation condition can be: a termination of the navigation process based on the route planning result for the electronic device; and/or reaching a distance less than a predefined distance between the destination and the current position of the electronic device. It is understood that, the navigation condition can be defined according to various requirements, and is not limited to the above examples.

Figure 4:
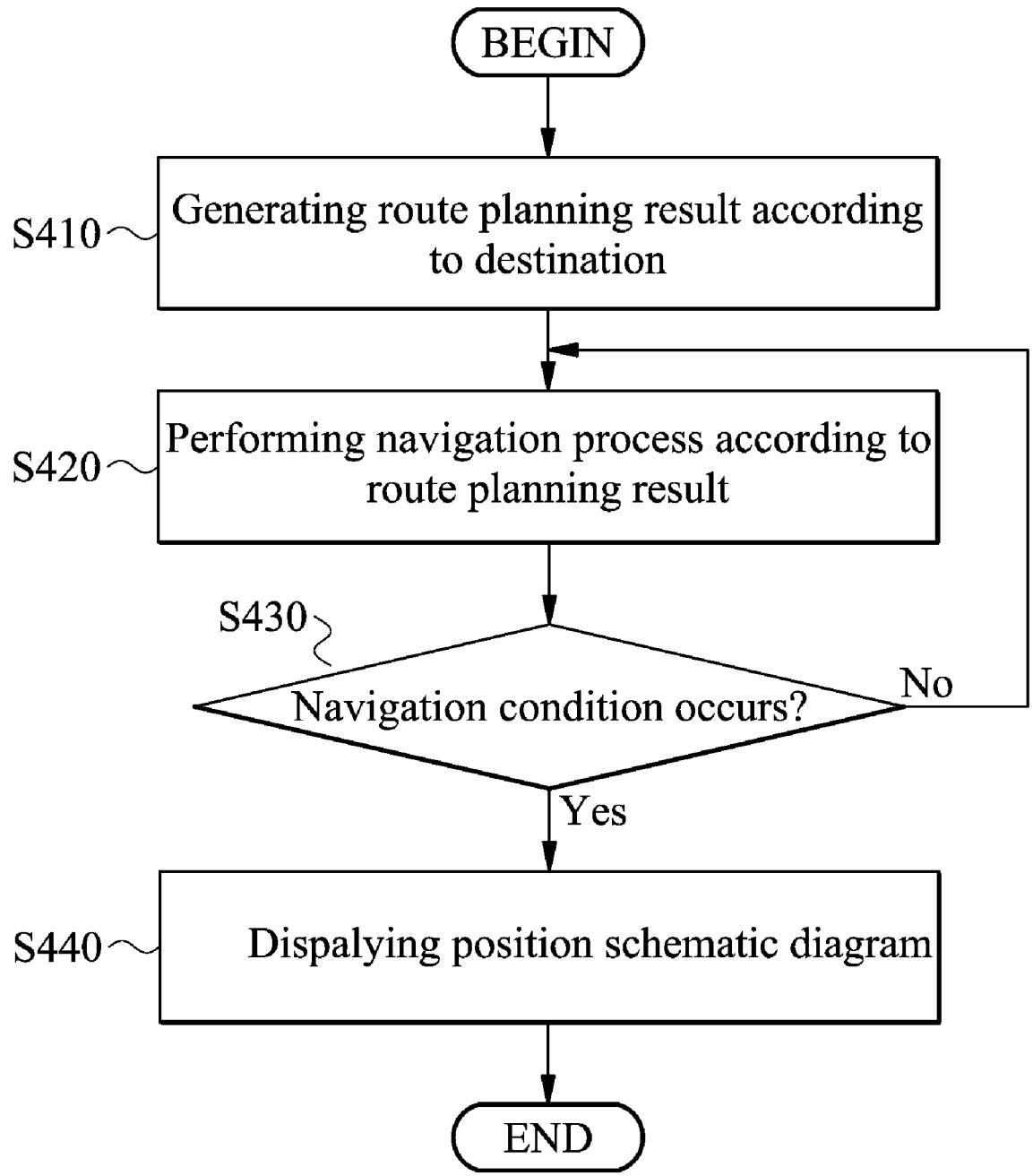
FIG. 4 is a flowchart of an embodiment of a navigation method of the invention.

FIG. 4 is a flowchart of an embodiment of a navigation method of the invention. The navigation method is suitable for use in an electronic device, such as a computer system or a portable device having a navigation function.

In step S410, a route planning result is generated according to at least one navigation parameter, such as a destination. In step S420, a navigation process is performed according to the route planning result. It is understood that, during the navigation process, the electronic device will continually receive satellite signals, and calculate the current position of the electronic device according to the satellite signals. In step S430, it is determined whether at least one predefined navigation condition has occurred. Similarly, the determination of whether the navigation condition has occurred can be performed by determining whether the navigation process based on the route planning result is terminated, and/or determining whether the distance between the destination and the current position of the electronic device is less than a predefined distance It is noted that again, the navigation condition can be defined according to various requirements, and is not limited to the above examples. If the navigation condition does not occur (No in step S430), the procedure returns to step S420, the navigation process is proceeded according to the route planning result, and in step S430, it is determined whether the navigation condition has occurred. When the navigation condition has occurred (Yes in step S430), in step S440, a position schematic diagram is displayed. The position schematic diagram comprises the destination and the current position of the electronic device. Similarly, the position schematic diagram may also comprise at least one landmark. In some embodiments, the position schematic diagram may be a circle having a center of the destination and a predefined radius. Additionally, in some embodiments, the distance between the destination and the current position of the electronic device can be also calculated and indicated in the position schematic diagram. In some embodiments, a specific locality, such as north can be also indicated in the position schematic diagram.

Therefore, the navigation methods and systems can display a position schematic diagram when the specific navigation condition has occurred. The position schematic diagram may comprise the destination and the current position of the electronic device, thus assisting destination recognition.

Navigation methods and systems, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A navigation method for use in an electronic device, comprising:
   generating a route planning result according to at least a destination by the electronic device;
   performing a navigation process according to the route planning result by the electronic device;
   determining whether at least one navigation condition has occurred; and
   when the navigation condition has occurred, displaying a position schematic diagram, wherein the position schematic diagram comprises the destination and a current position of the electronic device, wherein the determination of whether the navigation condition has occurred is performed by determining whether the navigation process based on the route planning result has terminated.

2. The method of claim 1, further comprising displaying at least one landmark surrounding the destination.

3. The method of claim 1, wherein the position schematic diagram has a center of the destination.

4. The method of claim 1, wherein the position schematic diagram comprises a circle having a center of the destination and a predefined radius.

5. The method of claim 1, further comprising indicating a distance between the destination and the current position of the electronic device in the position schematic diagram.

6. The method of claim 1, wherein the position schematic diagram is displayed alone, or simultaneously displayed with a map.

7. A navigation system for use in an electronic device, comprising:
   a display unit; and
   a processing unit generating a route planning result according to at least a destination, wherein the electronic device performs a navigation process according to the route planning result, the processing unit determining whether at least one navigation condition has occurred, and when the navigation condition has occurred, displaying a position schematic diagram in the display unit, wherein the position schematic diagram comprises the destination and a current position of the electronic device, wherein the determination of whether the navigation condition has occurred is performed by determining whether the navigation process based on the route planning result has terminated.

8. The system of claim 7, wherein the processing unit further displays at least one landmark surrounding the destination.

9. The system of claim 7, wherein the position schematic diagram has a center of the destination.

10. The system of claim 7, wherein the position schematic diagram comprises a circle having a center of the destination and a predefined radius.

11. The system of claim 7, wherein the processing unit further indicates a distance between the destination and the current position of the electronic device in the position schematic diagram.

12. The system of claim 7, wherein the position schematic diagram is displayed alone, or simultaneously displayed with a map.

13. A machine-readable storage medium comprising a computer program, which, when executed, causes a device to perform a navigation method, and the method comprising:
- generating a route planning result, wherein the device performs a navigation process according to the route planning result;
- determining whether at least one navigation condition has occurred; and
- when the navigation condition has occurred, displaying a position schematic diagram, wherein the position schematic diagram comprises the destination and a current position of the electronic device, wherein the determination of whether the navigation condition has occurred is performed by determining whether the navigation process based on the route planning result has terminated.

* * * * *